(12) United States Patent
Yamasaki

(10) Patent No.: US 11,742,135 B2
(45) Date of Patent: Aug. 29, 2023

(54) TRANSFORMER AND DC-DC CONVERTER WITH TRANSFORMER

(71) Applicant: DENSO CORPORATION, Kariya (JP)

(72) Inventor: Shotaro Yamasaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 489 days.

(21) Appl. No.: 16/895,826

(22) Filed: Jun. 8, 2020

(65) Prior Publication Data

US 2020/0388434 A1    Dec. 10, 2020

(30) Foreign Application Priority Data

Jun. 6, 2019  (JP) .................................. 2019-106455

(51) Int. Cl.
| | |
|---|---|
| *H01F 27/30* | (2006.01) |
| *H01F 27/32* | (2006.01) |
| *H01F 41/12* | (2006.01) |
| *H01F 27/28* | (2006.01) |
| *H02M 3/158* | (2006.01) |
| *H01F 27/08* | (2006.01) |
| *H01F 30/06* | (2006.01) |

(52) U.S. Cl.
CPC ............. *H01F 27/32* (2013.01); *H01F 27/08* (2013.01); *H01F 27/2876* (2013.01); *H01F 30/06* (2013.01); *H01F 41/12* (2013.01); *H02M 3/158* (2013.01)

(58) Field of Classification Search
USPC ........ 336/208, 221, 192, 212, 185, 195–198
See application file for complete search history.

(56) References Cited

U.S. PATENT DOCUMENTS

| | | | | |
|---|---|---|---|---|
| 2010/0271162 | A1* | 10/2010 | Yan .......................... | H01F 17/04 336/98 |
| 2015/0318098 | A1* | 11/2015 | Miyamoto .............. | H01F 30/00 336/183 |
| 2019/0148049 | A1* | 5/2019 | Takiguchi ............. | H01F 27/025 336/61 |
| 2019/0392976 | A1* | 12/2019 | Inagaki ................... | H01F 27/28 |

FOREIGN PATENT DOCUMENTS

| | | | |
|---|---|---|---|
| JP | 2010093014 | A | 4/2010 |
| JP | 2013-030565 | A | 2/2013 |
| JP | 2013030565 | A * | 2/2013 |
| JP | 2014072334 | A | 4/2014 |
| JP | 5522074 | B2 | 6/2014 |
| JP | 2016115864 | A | 6/2016 |
| JP | 2018-006650 | A | 1/2018 |
| JP | 2018-074095 | A | 5/2018 |
| WO | 2018/167947 | A1 | 9/2018 |

* cited by examiner

*Primary Examiner* — Shawki S Ismail
*Assistant Examiner* — Kazi S Hossain
(74) *Attorney, Agent, or Firm* — Oliff PLC

(57) ABSTRACT

A novel transformer includes a first coil, at least one secondary coil magnetically coupled with the first coil and an electrically insulating holder. The first coil and the at least one secondary coil face each other with the holder therebetween. The holder has at least one through hole at a portion sandwiched between the first coil and the at least one second coil. The transformer also includes at least one electric insulating heat radiation member disposed in the at least one through hole in contact with the first coil and the at least one second coil. The heat radiation member has a higher heat conductivity than the holder.

9 Claims, 5 Drawing Sheets

TRANSFORMER AND DC-DC CONVERTER WITH TRANSFORMER

CROSS-REFERENCE TO RELATED APPLICATION

This patent application is based on and claims priority to Japanese Patent Application No. 2019-106455, filed on Jun. 6, 2019 in the Japan Patent Office, the entire disclosure of which is hereby incorporated by reference herein.

BACKGROUND

Technical Field

The present disclosure relates to a transformer composed of a magnetically coupled first and second coils and a DC-DC converter with the transformer.

Related Art

A known transformer is composed of a holder having a cylindrical portion and first to fourth disc-shaped portions radially protruding from the cylindrical portion.

The known transformer is also composed of a primary coil wound around the cylindrical portion between the first and second disc-shaped portions. The known transformer is also composed of a second coil wound around the cylindrical portion while contacting a main surface of the second disc-shaped portion opposite a surface facing the first disc-shaped portion.

However, in a known transformer, although a primary coil (i.e., a first coil) and a secondary coil (i.e., a second coil) are insulated from each other by a holder, the secondary coil is disposed inside of the primary coil. As a result, heat radiation from the secondary coil is insufficient.

SUMMARY

Accordingly, one aspect of the present disclosure provides a novel transformer that includes a first coil, at least one secondary coil magnetically coupled with the first coil and an electrically insulating holder. The first coil and the at least one second coil face each other with the holder therebetween. The holder has at least one through hole at a portion sandwiched between the first coil and the at least one second coil. The transformer also includes at least one heat radiation member disposed in the at least one through hole in contact with the first coil and the at least one second coil. The electrically insulating heat radiation member has a higher heat conductivity than the holder.

Hence, according to one aspect of the pin, the first coil and the second coil are magnetically coupled in the transformer. The first coil and the second coil are opposed to each other across the electrically insulating holder. Further, temperature of each of the first and second coils is different from each other due to a difference in heat radiation and value of flowing current therebetween in the transformer. Further, one of the coils may be the primary coil and the other one of the coils may be the second coil or vice versa.

Further, the through hole is formed in a portion of the holder between the first coil and the second coil. Besides, the insulation heat radiation member having an insulation property and a heat conductivity higher than that of the holder is disposed in the through hole, contacting both the first coil and the second coil. Hence, since the heat radiation member has the insulation property, the first coil and the second coil can be insulated from each other by the heat radiation member. Further, thermal conduction is performed between the first coil and the second coil through the heat radiation member having the higher heat conductivity than that of the holder. Hence, heat can be effectively conducted from one of the first coil and the second coil having higher temperature to the other one of the first coil and the second coil having lower temperature. As a result, the heat radiation of the coils in the transformer can be improved while ensuring insulation between these coils.

Another aspect of the present disclosure provides a novel DC-DC converter that includes a heat sink, the above-described transformer and a converter holder to fix the at least one core to the heat sink. The first coil is disposed between a pair of second coils.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein.

DETAILED DESCRIPTION

Figure 1:
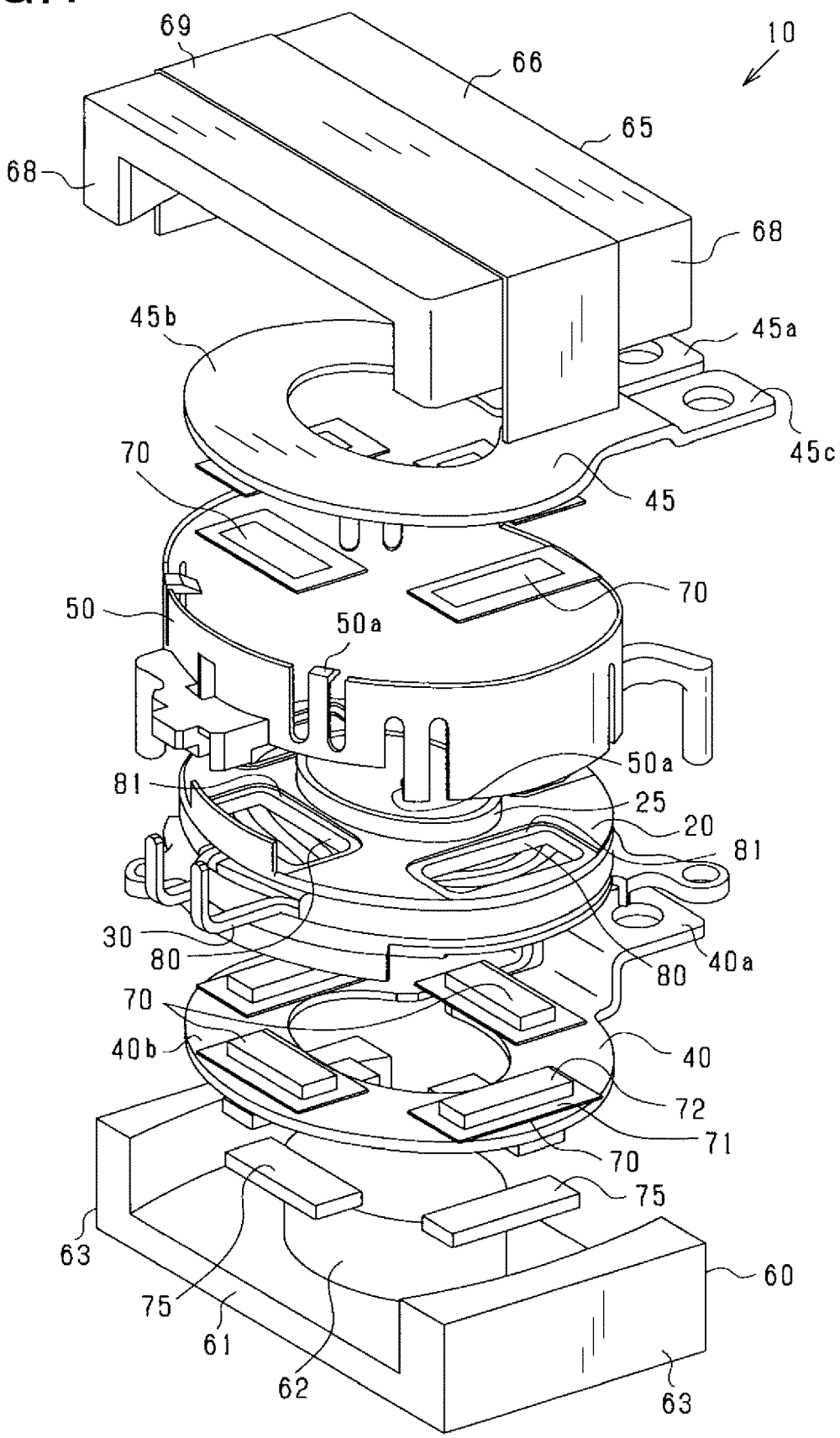
FIG. 1 is an exploded perspective view illustrating a transformer according to one embodiment of the present disclosure.

As described in Japanese Patent No. 5522074 (JP-5522074-B), although a primary coil (i.e., a first coil) and a secondary coil (i.e., a second coil) of a known transformer are insulated from each other by a holder, the secondary coil is disposed inside of the primary coil. As a result, heat radiation from the secondary coil is insufficient. Hence, the present disclosure has been made to address the above-described problem and it is an object to improve heat radiation from magnetically coupled first and second coils constituting a transformer while ensuring insulation therebetween.

Referring now to the drawings, wherein like reference numerals designate identical or corresponding parts throughout the several views thereof, and to FIG. 1 and applicable drawings, an exemplary transformer used in a buck (stepdown) type DC-DC converter will be described as one embodiment of the present disclosure.

Figure 2:
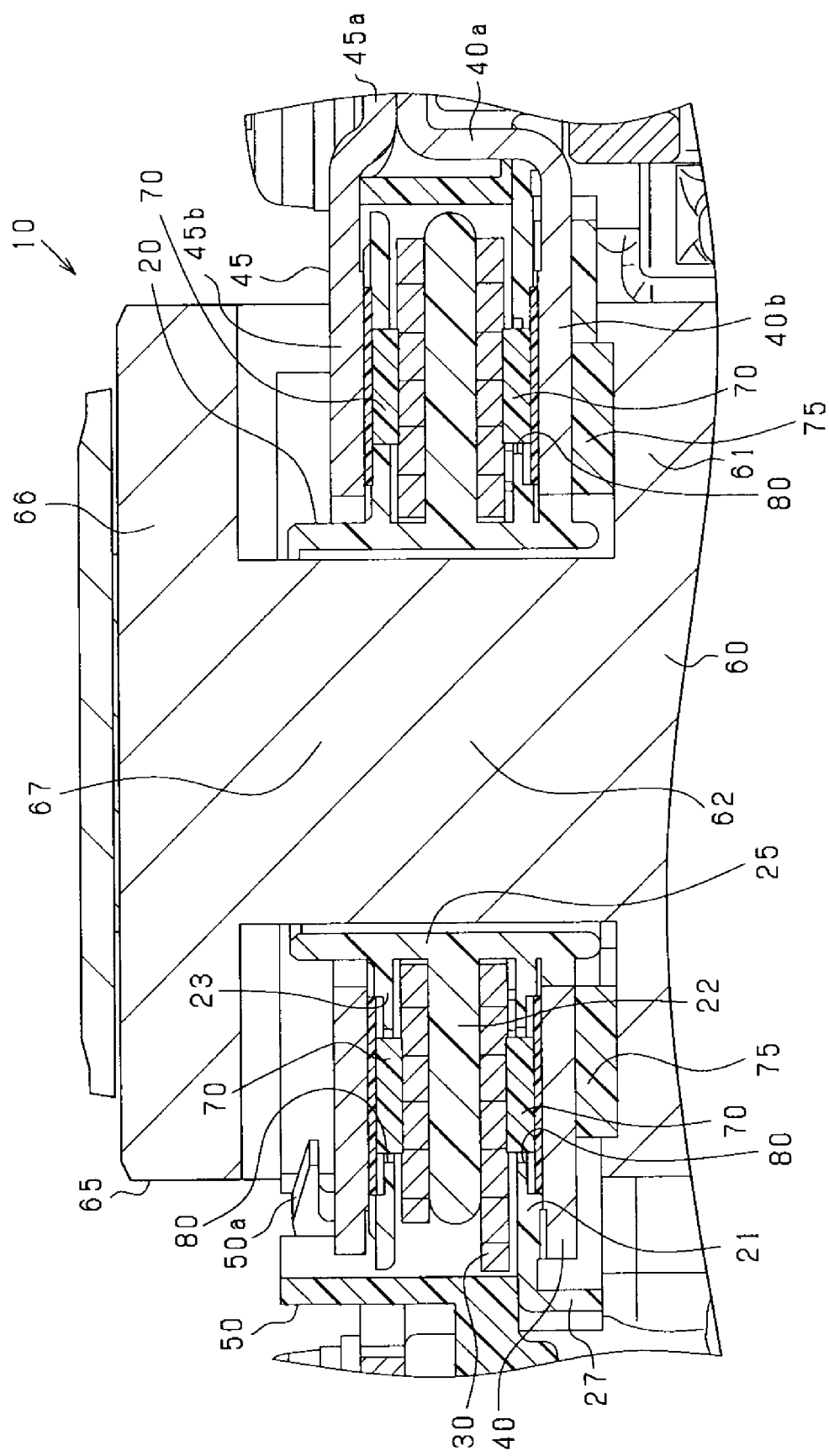
FIG. 2 is a cross-sectional view illustrating the transformer of FIG. 1.

Specifically, as shown in FIGS. 1 and 2, a transformer 10 includes a cylindrical bobbin 20, a primary coil 30 and a pair of secondary coils 40 and 45. The transformer 10 also includes a housing 50 and a pair of cores 60 and 65 or the like. Herein below, an axial direction of the cylindrical bobbin 20 is referred to as either an upward direction or a downward direction corresponding to an upward direction and a downward direction of each of FIGS. 1 and 2, respectively.

More specifically, the bobbin 20 (i.e., a holder) is made of resin having an insulation property to act as an insulator. The bobbin 20 has a cylindrical portion 25, first to third flanges 21 to 23 and a peripheral wall portion 27 or the like.

The cylindrical portion 25 has either a cylindrical shape or an elliptical tubular shape. The first to third flanges 21 to 23 protrude from the cylindrical portion 25. Each of the first to third flanges 21 to 23 has a disc-shape having substantially the same size. Each of the first to third flanges 21 to 23 is disposed substantially parallel to each other substantially perpendicular to the cylindrical portion 25. However, the cylindrical portion 25 can have a polygonal tubular shape.

The peripheral wall portion 27 is extended downward from an outer edge of the first flange 21. More specifically, the peripheral wall portion 27 is extended downward from a circumferential portion of the first flange 21. Hence, an annular space accommodating a lower side secondary coil 40 is partitioned by the cylindrical portion 25, the first flange 21 and the peripheral wall portion 27.

Between the first flange 21 and the second flange 22, a first gap corresponding to a thickness (a height in the vertical direction) of a coil winding of the primary coil 30 is formed. Similarly, between the second flange 22 and the third flange 23, a second gap corresponding to a thickness (a height in the vertical direction) of the coil winding of the primary coil 30 is formed.

That is, in each of the first gap and the second gap, the coil winding of the primary coil 30 is separately wound in a spiral state around the cylindrical portion 25. Here, a cross-section of an element of the coil winding has a rectangular shape, for example. Further, the coil winding wound in the first gap and the coil winding wound in the second gap are connected to each other in the vicinity of the cylindrical portion 25. That is, the primary coil 30 (i.e., a first coil) constitutes a two-layer structure. A surface of the element of the coil winding is covered with an insulating film made of enamel, for example.

Further, the primary coil 30 is substantially entirely placed in an opposing range in which the first flange 21 and the second flange 22 are opposed to each other and an opposing range in which the second flange 22 and the third flange 23 are opposed to each other. That is, the primary coil 30 is disposed from inner edges (i.e., bottoms) of the first to third flanges 21 to 23 to outer edges (i.e., tips) thereof, respectively.

Further, a pair of secondary coils 40 and 45 (i.e., a pair of second coils) is employed in the transformer 10. Each of the secondary coils 40 and 45 is composed of a metal plate having a given thickness and substantially a U-shape.

More specifically, a lower side secondary coil 40 includes a main body portion 40b having a C-letter shape when viewed vertically and a pair of arms 40a (not shown) and 40c extended from both ends of the main body portion 40b, respectively. The main body portion 40b has substantially the same size as the first flange 21. The main body portion 40b is housed in the space partitioned by the cylindrical portion 25, the first flange 21 and the peripheral wall portion 27. More specifically, an upper surface of the main body portion 40b is disposed in contact with a lower surface of the first flange 21. However, the upper surface of the main body portion 40b is not necessarily disposed in contact with the lower surface of the first flange 21.

Further, an upper side secondary coil 45 also includes a main body portion 45b having a C-letter shape when viewed vertically and a pair of arms 45a and 45b extended from both ends of the main body portion 45b, respectively. The main body portion 45b has substantially the same size as the third flange 23. A lower surface of the main body portion 45b is disposed in contact with an upper surface of the third flange 23. However, the lower surface of the main body portion 45b is not necessarily disposed in contact with it and can be separated from the upper surface of the third flange 23.

Further, the arm portions 40a and 45a are connected to each other to allow a current to flow into the lower side secondary coil 40 and the upper side secondary coil 45 in a given direction.

Further, a lower layer portion of the primary coil 30 and the lower side secondary coil 40 are opposed to each other across the first flange 21 (i.e., a part of the bobbin 20). More specifically, the lower layer portion of the primary coil 30 and the lower side secondary coil 40 are opposed to each other across substantially the entirety of the first flange 21. That is, the first flange 21 in its entirety occupies as an opposing range in which the lower layer portion of the primary coil 30 and the lower side secondary coil 40 face each other.

Similarly, an upper layer portion of the primary coil 30 and the upper side secondary coil 45 are opposed to each other across the third flange 23 (i.e., a part of the bobbin 20). More specifically, the upper layer portion of the primary coil 30 and the upper side secondary coil 45 are opposed to each other across substantially the entirety of the third flange 23. That is, the third flange 23 in its entirety occupies as an opposing range in which the upper layer portion of the primary coil 30 and the upper side secondary coil 45 face each other.

Further, the housing 50 is cylindrical (e.g., an elliptical tubular state) and made of insulation material, such as resin (i.e., resin having an insulation property), etc. More specifically, the housing 50 has a size corresponding to each of the main body portions 40b and 45b of the respective secondary coils 40 and 45. Hence, the main body portions 40b and 45b, the bobbin 20 and the primary coil 30 are housed in the housing 50. Further, the housing 50 includes multiple claw portions 50a alternately extended from an upper end and a lower end thereof. Hence, the main body portions 40b and 45b are respectively engaged by these nail portions 50a. However, the housing 50 can have a polygonal tubular shape.

Further, the lower side core 60 is made of magnetic material. The lower side core 60 includes a main body 61, a cylindrical main leg 62 and a side leg 63. The main body 61 has a rectangular tabular shape. The main leg 62 has a cylindrical shape (or an elliptical cylindrical shape) and is extended from a center of the main body 61. The side leg 63 is extended from both ends of the main body 61 in the same direction as the main leg 62. Hence, the main leg 62 is inserted into the cylindrical portion 25 of the bobbin 20. However, the main leg 62 can have any shape as long as the cylindrical portion 25 can accommodate the main leg 62 therein. For example, the main leg 62 can have a polygonal columnar shape.

Further, the upper side core 65 is also made of magnetic material and is configured to be substantially symmetrical with the lower side core 60. More specifically, the upper side core 65 includes a main body 66, a cylindrical columnar portion 67 and a side wall portion 68. The cylindrical columnar portion 67 is inserted into the cylindrical portion 25 of the bobbin 20. The above-described main leg 62 and the cylindrical columnar portion 67 are brought in contact with each other. The above-described side leg 63 and the side wall portion 68 are also brought in contact with each other.

Figure 3:
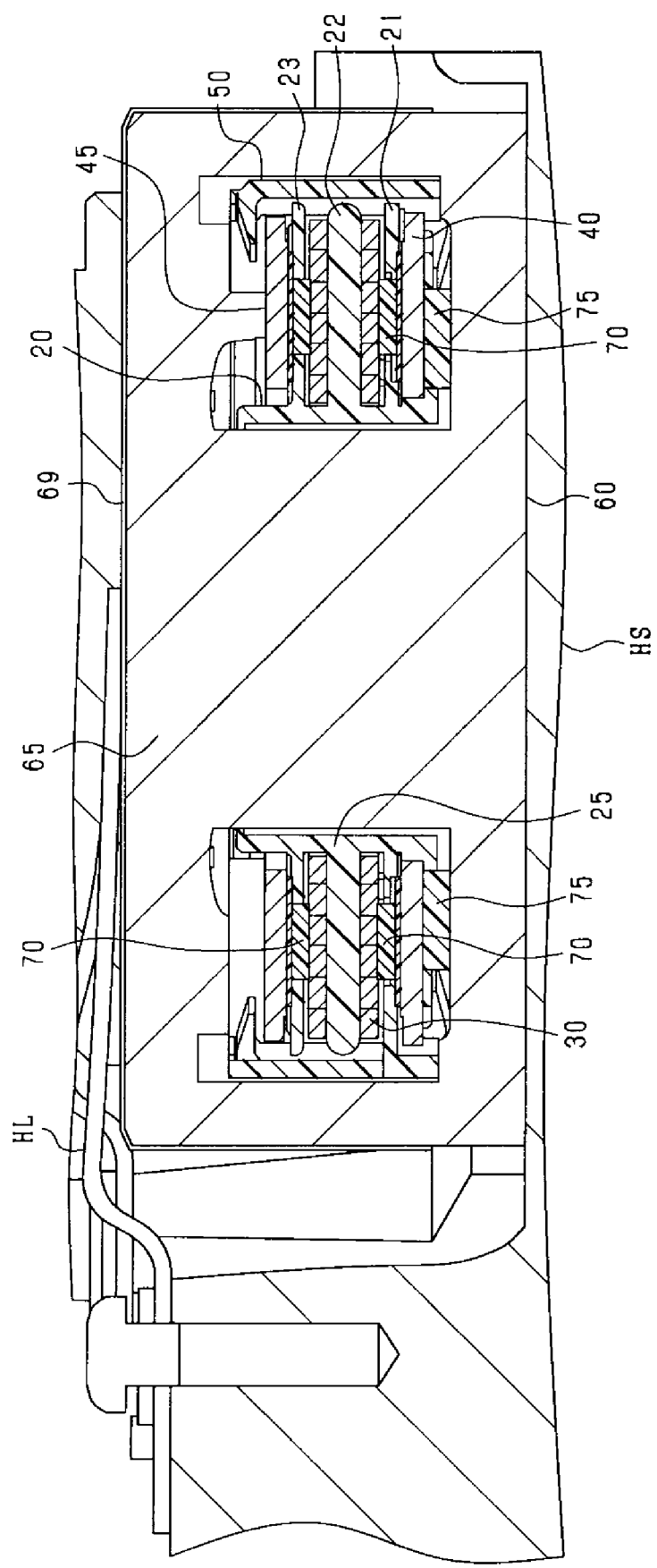
FIG. 3 is a cross-sectional view illustrating a transformer and a heat sink according to one embodiment of the present disclosure.

As shown in FIG. 3, the lower side core 60 and the upper side core 65 are temporarily fixed by a tape 69 while substantially sandwiching the bobbin 20, the primary coil 30, the secondary coils 40 and 45 and the housing 50. That is, the pair of cores 60 and 65 surrounds the primary coil 30 and the secondary coils 40 and 45. Hence, the primary coil 30 and the pair of secondary coils 40 and 45 are magnetically coupled with each other. The transformer 10 temporarily fixed by the tape 69 in this way is mounted and fixed onto the DC-DC converter.

Further, the pair of cores 60 and 65 are fixed to a heat sink HS provided in the DC-DC converter by a converter holder HL. However, since the primary coil 30 is disposed vertically inside of the pair of secondary coils 40 and 45 in the transformer 10, temperature of the primary coil 30 tends to be higher than that of the pair of secondary coils 40 and 45. As a result, heat radiation from the primary coil 30 becomes insufficient.

Figure 4:
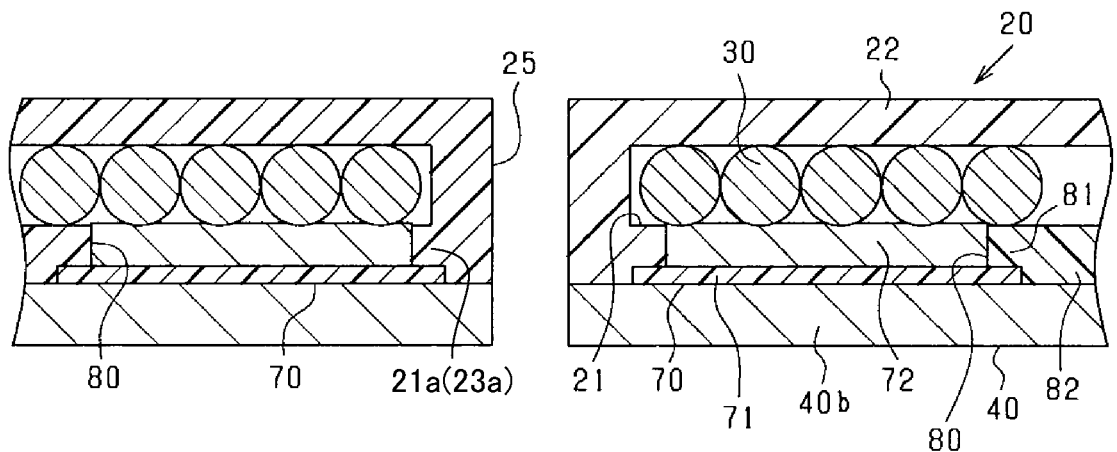
FIG. 4 is a schematic diagram illustrating a first heat radiation member and a peripheral thereof according to one embodiment of the present disclosure.

In view of this, according to this embodiment, as shown in FIG. 4, the transformer 10 includes multiple first heat radiation members 70 that collectively effectively conduct heat from the primary coil 30 to the pair of secondary coils 40 and 45.

That is, FIG. 4 is a schematic view illustrating the first heat radiation members 70 and surroundings thereof. As shown, multiple through holes 80 are formed in each of the first flange 21 and the third flange 23 between the primary coil 30 and one of the pair of secondary coils 40 and 45 in the bobbin 20. The through hole 80 has a rectangular shape. Each of the through holes 80 is formed within an opposing range of the flanges 21 and 23, in which the primary coil 30 and corresponding one of the pair of secondary coils 40 and 45 are opposed to each other. Specifically, four through holes 80 are formed in each of the flanges 21 and 23 at substantially the same intervals. Further, in the flanges 21 and 23, an inner peripheral wall 81 of the through hole 80 is partially thinned to be thinner than an outer portion 82 than the inner peripheral wall 81. That is, a portion forming the through hole 80 in each of the flanges 21 and 23 is thinned by including a stepped or inclined cross section.

Further, the first heat radiation members 70 are disposed within the flanges 21 and 23 without protruding therefrom. Each of the first heat radiation members 70 includes a first property member 71 and a second property member 72.

More specifically, the first property member 71 has a rectangular sheet-like shape made of heat-resistant insulation material (e.g., heat-resistant insulating resin). In a plan view, each of the first property members 71 has a shape and a size formed and calculated by combining the through hole 80 with the inner peripheral wall 81. Each of the first property members 71 is brought in contact with one of the pair of secondary coils 40 and 45.

Further, the total thickness of the first property member 71 and the inner peripheral wall 81 is substantially equal to a thickness of the outer portion 82 of the first flange 21 than the inner peripheral wall 81. Hence, the first property member 71 is fitted into a hollow out portion (i.e., a recess) formed by the inner peripheral wall 81 in the first flange 21. Thus, a lower surface (and/or an upper surface) of the flange 21 (23) and a lower surface (and/or an upper surface) of the first property member 71 coincide with each other. Hence, an outer edge of the first property member 71 is overlaid on the thinner portion 21a (31a) of the flange 51 of the holder 20 (e.g., the bobbin) while fitting to the inner peripheral wall 81 thereby completely covering the through hole 80. That is, each of the first property members 71 has an outer edge that entirely contacts a thinner portion 21a (31a) of each of the through holes 80 of the flanges 21 and 23 in an opposing direction (i.e., a thickness direction of the flange) in which the primary coil 30 and each the pair of secondary coils 40 and 45 are opposed.

Further, each of the second property members 72 has a rectangular tabular shape (or a rectangular sheet-like shape made of the heat-resistant and high heat-conductivity-insulation material (e.g., silicon rubber, high heat conductivity resin, etc.). More specifically, each of the second property members 72 has a higher heat conductivity than each of the bobbin 20 and each of the first property members 71. The second property member 72 is brought in contact with the primary coil 30. The first property member 71 and the second property member 72 are integrated with each other. Further, a heat conductivity of the first heat radiation member 70 as a total of conductivities of the first property member 71 and the second property member 72 is higher than the heat conductivity of the bobbin 20.

Further, in a plan view, the second property member 72 has either substantially the same shape or a similar shape as the through hole 80 (i.e., a shape fitting into the through hole 80). The first heat radiation member 70 is brought in contact with both the primary coil 30 and the secondary coil 40 (45). Further, the first heat radiation member 70 is placed being compressed by the primary coil 30 and the secondary coil 40 (45).

Further, the first property member 71 is inserted into the through hole 80. At the same time, the second property member 72 completely covers both the first property member 71 and the through hole 80. However, since the first property member 71 can insulate the primary coil 30 and each of secondary coils 40 and 45 from each other, an insulation property is not needed in the second property member 72.

Further, multiple second heat radiation members 75 are arranged between the lower side secondary coil 40 and the lower side core 60, contacting both the lower side secondary coil 40 and the lower side core 60. Each of the second heat radiation members 75 has both an insulation property and a higher heat conductivity than that of the bobbin 20. Each of the second heat radiation member 75 has a rectangular tabular shape or a rectangular sheet-like shape. Hence, each of the second heat radiation members 75 is shaped to position within a range in which the lower side secondary coil 40 and the lower side core 60 face each other. More specifically, four second heat radiation members 75 are disposed at substantially the same intervals for the lower side secondary coil 40.

Now, various advantages obtained by the above-described embodiment are herein below described.

First, according to one aspect of the present disclosure, the through hole 80 is formed in a portion between the primary coil 30 and each of secondary coils 40 and 45 (i.e., the flanges 21 and 23) in the bobbin 20. In the through hole 80, the first heat radiation member 70 having a higher heat conductivity than that of the bobbin 20 is disposed in contact with both the primary coil 30 and one of the pair of secondary coils 40 and 45. Since it has an insulation property, the first heat radiation member 70 can insulate the primary coil 30 and each of secondary coils 40 and 45 from each other. Further, heat is conducted between the primary coil 30 and each of secondary coils 40 and 45 through the first heat radiation member 70 having a higher heat conductivity than that of the bobbin 20. Hence, heat can be effectively conducted from one of the primary coil 30 and the secondary coil 40 (45) having higher temperature to the other one of the primary coil 30 and the secondary coil 40 (45) having lower temperature therebetween. Hence, the heat radiation from these coils can be improved while ensuring the insulation therebetween.

Further, according to one aspect of the present disclosure, the through hole 80 is shaped to position within the opposing range in which the primary coil 30 and one of the pair of secondary coils 40 and 45 face each other. Hence, the through hole 80 can be formed within the bobbin 20 without expanding the bobbin 20 to an outer side than the opposing range. Furthermore, the first heat radiation member 70 is disposed within the opposing range. Hence, an extra space is not needed in an outer side than the opposing range to accommodate the first heat radiation member 70. As a result, the first heat radiation member 70 arranged in the transformer 10 does not upsize the transformer 10 and can maintain the compact size of the transformer 10.

Further, according to one aspect of the present disclosure, the first heat radiation member 70 has an outer edge entirely contacting the inner peripheral wall 81 of the through hole 80 formed in each of the flanges 21 and 23 in the opposing direction, in which the primary coil 30 and one of the pair of secondary coils 40 and 45 are opposed. With such a configuration, the through hole 80 located between the primary coil 30 and each of secondary coils 40 and 45 can be wholly occupied by the first heat radiation member 70. Hence, both the insulation property and the heat conductivity between the primary coil 30 and each of secondary coils 40 and 45 can be effectively improved. Furthermore, in this embodiment, since the creeping distance (i.e., length) along the surface of each of the flanges 21 and 23 in the through hole 80 can be prolonged, creeping discharge generally caused along the surface can be either reduced or suppressed.

Further, according to one aspect of the present disclosure, since the first heat radiation member 70 completely covers the through hole 80, the through hole 80 disposed between the primary coil 30 and each of secondary coils 40 and 45 can be completely occupied by the first heat radiation member 70. Hence, both an insulation property and a heat conductivity between the primary coil 30 and each of secondary coils 40 and 45 can be effectively improved.

Further, according to one aspect of the present disclosure, each of the flanges 21 and 23 has a thinner portion 21a (31a) around the through hole 80 than the outer portion 82 thereof than the through hole 80, so that the outer edge of the first heat radiation member 70 can be overlaid on the thinner portion 21a (31a) of the flange 21 (23) while fitting to the inner peripheral wall 81. According to such a configuration, an increase in total thickness of each of the flange 21 and 23 and the first heat radiation member 70 can be suppressed at a place at which the thinner portion 21a (31a) of the flange 21 (23) and the first heat radiation member 70 fitting to the inner peripheral wall 81 are overlaid on each other. Hence, insulation between the primary coil 30 and each of secondary coils 40 and 45 can be effectively improved while either suppressing or reducing an increase in size of the transformer 10.

Further, according to one aspect of the present disclosure, the first property member 71 having an insulation property can insulate the primary coil 30 and each of secondary coils 40 and 45 from each other. Besides, thermal conduction between the primary coil 30 and each of secondary coils 40 and 45 can be effectively performed through the second property member 72 having a heat conductivity higher than that of both the bobbin 20 and the first property member 71. Furthermore, by allocating an electrical insulating function and a thermal conduction function performed by the first heat radiation member 70 to the first property member 71 and the second property member 72, respectively, the first heat radiation member 70 can be easily produced by using general-purpose material.

Further, according to one aspect of the present disclosure, since the first property member 71 is inserted into the through hole 80, thermal conduction between the primary coil 30 and each of secondary coils 40 and 45 via the through hole 80 and the first property member 71 can be effectively performed. Besides, since it completely covers both the first property member 71 and the through hole 80, the second property member 72 can enhance electrical insulation between the primary coil 30 and each of secondary coils 40 and 45.

Furthermore, according to one aspect of the present disclosure, the pair of cores 60 and 65 are arranged surrounding the primary coil 30 and the pair of secondary coils 40 and 45. Specifically, the second heat radiation member 75 with an insulation property and a heat conductivity higher than that of the bobbin 20 is arranged between the lower side secondary coil 40 and the lower side core 60 in contact with both the lower side secondary coil 40 and the lower side core 60. Since the second heat radiation member 75 has the insulation property, the second heat radiation member 75 can insulate the lower side secondary coil 40 and the lower side core 60 from each other. Further, the second heat radiation member 75 with the heat conductivity higher than that of the bobbin 20 effectively performs thermal conduction between the lower side secondary coil 40 and the lower side core 60. Accordingly, conduction of heat from the lower side secondary coil 40 to the lower side core 60 can be effectively performed. As a result, the heat radiation of the coils in the transformer 10 can be further improved.

Further, according to one aspect of the present disclosure, the primary coil 30 is coated with enamel. Hence, since enamel is cheap in general, the cost for the transformer 10 can be effectively reduced. Further, even if the enamel having a pinhole is coated, since insulation between the coils is satisfactory, insulation between the coils can be maintained in this embodiment.

Further, according to one aspect of the present disclosure, since the first heat radiation member 70 is disposed being compressed by the primary coil 30 and each of the secondary coils and 40 and 45, heat conductivity between the primary coil 30 and each of secondary coils 40 and 45 can be effectively promoted.

Now, various modifications obtained by modifying the above-described embodiment are herein below described with reference to FIGS. 5 to 7.

Figure 5:
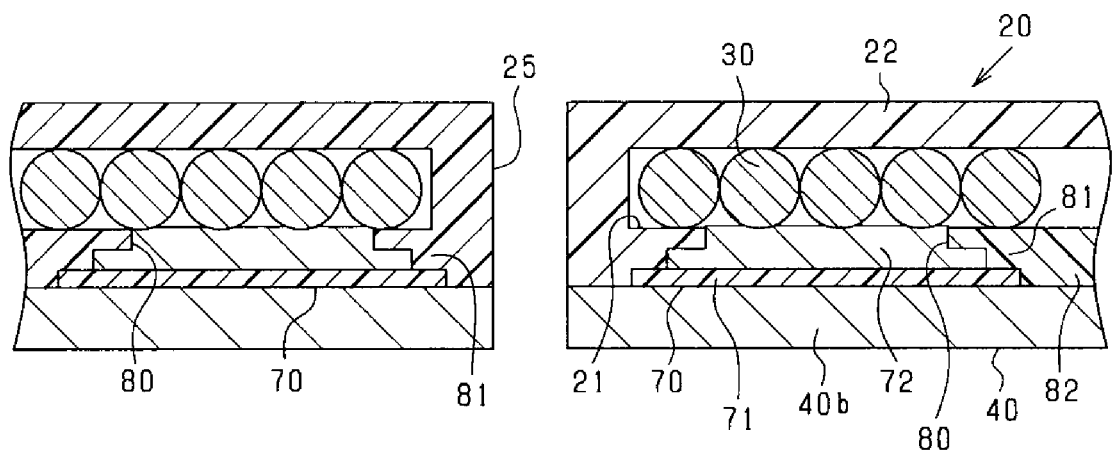
FIG. 5 is a schematic diagram illustrating a modification prepared based on the first heat radiation member and the peripheral thereof shown in FIG. 4.

First, as shown in FIG. 5, the inner peripheral wall 81 of the through hole 80 formed in the first flange 21 (i.e., the holder) can be formed stepwise. Correspondingly, the outer edge of the first heat radiation member 70 can have a shape fitting into the inner peripheral wall 81. According to such a configuration, when either suppressing or reducing creeping discharge caused along a surface of the first flange 21 in the through hole 80, the first flange 21 is not necessarily thickened. That is, only extension of a creeping distance is needed. Furthermore, the outer edge of the first heat radiation member 70 has a shape fitting into the inner peripheral wall 81 of the through hole 80. With such a modification, since the outer edge of the first heat radiation member 70 can be overlaid on the thinner portion 21*a* (31*a*) of the flange 21 while fitting to the inner peripheral wall 81 of the through hole 80, an increase in total thickness of the first heat radiation member 70 and the first flange 21 can be either reduce or suppressed.

Figure 6:
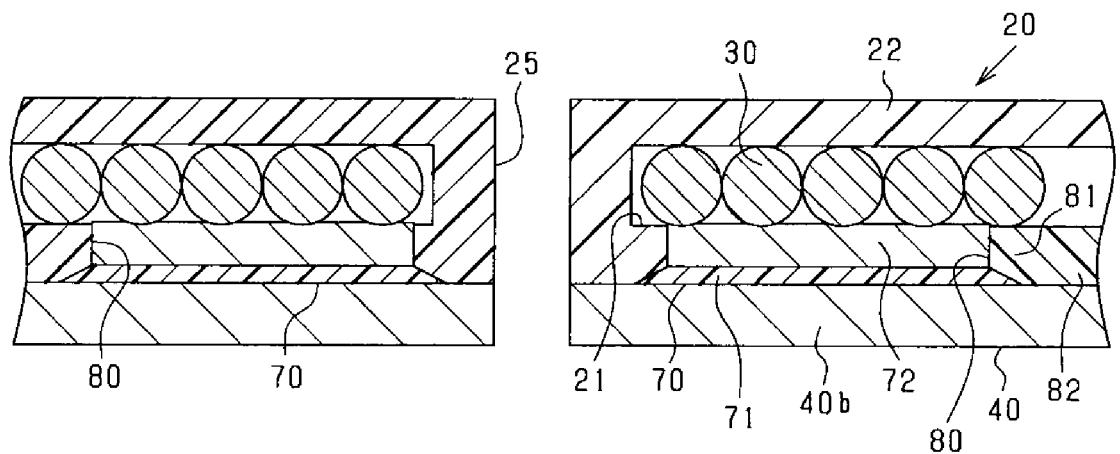
FIG. 6 is a schematic diagram illustrating yet another modification prepared based on the first heat radiation member and the peripheral thereof shown in FIG. 4.

Secondly, as shown in FIG. 6, the inner peripheral wall 81 of the through hole 80 formed in the first flange 21 may be tapered. Correspondingly, the outer edge of the first heat radiation member 70 can be shaped to fit into the inner peripheral wall 81. With such a configuration of this modification, the advantage as obtained by the first heat radiation member 70 of FIG. 5 can be similarly obtained.

Thirdly, the first property member 71 and the second property member 72 can be separated. According to such a configuration, labor of integrating the first property member 71 and the second property member 72 can be either reduced or omitted.

Fourthly, as shown in FIGS. 4 to 6, the first heat radiation member 70 can be formed by a single member having both an insulation property and a heat conductivity higher than that of the bobbin 20 (i.e., the holder).

Figure 7:
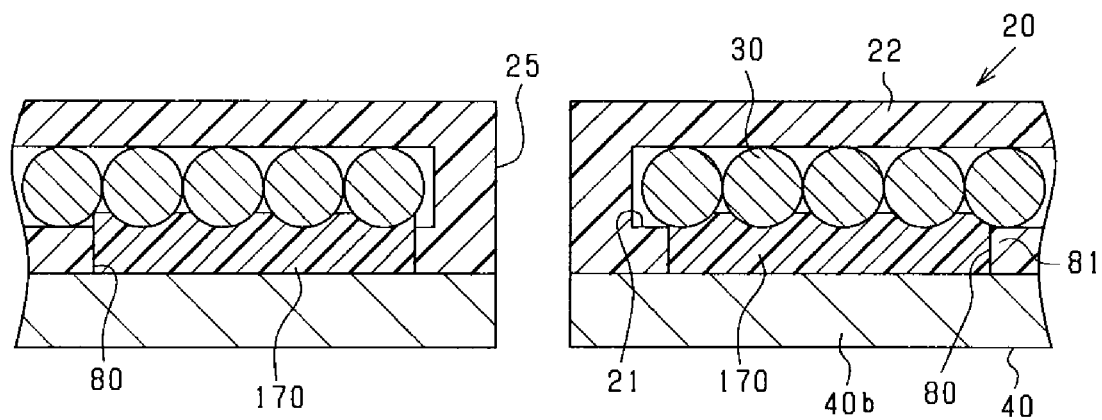
FIG. 7 is a schematic diagram illustrating yet another modification prepared by modifying the first heat radiation member and the peripheral thereof shown in FIG. 4.

Fifthly, as shown in FIG. 7, the inner peripheral wall 81 of the through hole 80 of the bobbin 20 can have substantially the same thickness as the outer portion than the inner peripheral wall 81. That is, the inner peripheral wall 81 of the through hole 80 of the first flange 21 does not need to employ the stepwise or tapered shapes. That is, the first heat radiation member 170 is prepared by a single member in a rectangular disc-shaped (rectangular sheet-like) state having a uniform thickness made of material having an insulation property and a heat conductivity higher than that of the bobbin 20. In addition, the first heat radiation member 170 is desirably shaped to completely cover the through hole 80 to suppress deterioration of insulation between the primary coil 30 (i.e., the first coil) and the secondary coil 40 (i.e., the second coil). That is, a gap is desirably absent between the through hole 80 and the first heat radiation member 170.

Sixthly, the first heat radiation member 70 (170) is not limited to be either the disc-shaped or the sheet-like, and can be gel-like.

Seventhly, the shape of the through hole 80 is not limited to be rectangular and can be polygonal, elliptical and circular or the like. Also, in such a situation, the first heat radiation member 70 (170) desirably has either substantially the same shape or a similar shape as the through hole 80 (i.e., a shape corresponding to the through hole 80) in a plan view.

Eighthly, the number of through holes 80, i.e., that of first heat radiation members 70 (170) disposed in the through holes 80 can be arbitrarily determined.

Ninthly, the first heat radiation member 70, 170 and the second heat radiation member 75 can be shaped to protrude outward from the opposing range in which the primary coil 30 and each of secondary coils 40 and 45 are opposed to each other.

Tenthly, each of the bobbin 20 and the primary coil 30 is not limited to the two-layer structure and can employ a single layer structure.

Eleventhly, a coil wire constituting the primary coil 30 is not limited to either a square conductor or a round conductor and can employ a disc-shaped conductor. Similarly, a coil wire constituting each of the secondary coils 40 and 45 is not limited to the disc-shaped conductor, and can employ either a square conductor having an insulation coat thereon or a round conductor having an insulation coat thereon.

Twelfthly, the insulation coat of the primary coil 30 is not limited to enamel and can employ resin, such as vinyl, polyethylene, etc.

Thirteenthly, the DC-DC converter is not limited to the step-down type and can employ a boost type. That is, in the transformer 10, the primary coil 30 can serve as the output side coil (i.e., the second coil) and the pair of secondary coils 40 and 45 can serve as the input side coils (i.e., the first coil). Further, the transformer 10 is not limited to that used in the DC-DC converter and can be used in a voltage converter or the like.

As described heretofore, according to one aspect of the present disclosure, a novel transformer (10) includes a first coil (30) and at least one secondary coil (40, 45) magnetically coupled with the first coil and an electrically insulating holder (20). The first coil (30) and the at least one secondary coil (40, 45) face each other across the holder (20). The holder has at least one through hole (80) at a portion (21, 23) sandwiched between the first coil and the at least one second coil. The transformer (10) also includes at least one heat radiation member disposed in the at least one through hole in contact with the first coil and the at least one second coil. The electrically insulating heat radiation member has a higher heat conductivity than the holder (70, 170).

Hence, according to one aspect of the pin, the first coil and the second coil are magnetically coupled in the transformer. The first coil and the second coil are opposed to each other across the electrically insulating holder. Further, temperature of each of the first and second coils is different from each other due to a difference in heat radiation and value of flowing current therebetween in the transformer. Further, one of the coils may be the primary coil and the other one of the coils may be the second coil vice versa.

Further, the through hole is formed in a portion of the holder between the first coil and the second coil. Besides, the insulation heat radiation member having an insulation property and a heat conductivity higher than that of the holder is disposed in the through hole, contacting both the first coil and the second coil. Hence, since the heat radiation member has the insulation property, the first coil and the second coil can be insulated from each other by the heat radiation member. Further, thermal conduction is performed between the first coil and the second coil through the heat radiation member having the higher heat conductivity than that of the holder. Hence, heat can be effectively conducted from one of the first coil and the second coil having higher temperature to the other one of the first coil and the second coil having lower temperature. As a result, the heat radiation of the coils in the transformer can be improved while ensuring the insulation between these coils.

According to another aspect of the present disclosure, the at least one through hole is formed within an opposing range in which the first coil and the at least one second coil face each other. Also, the at least one heat radiation member is disposed within the opposing range.

Hence, with such a configuration, since the through hole is formed within the opposing range in which the first coil and the second coil are opposed to each other, the holder does not need to be expanded outside the opposing range in order to secure the through hole. Further, since the heat radiation member is disposed within the opposing range, a space to arrange the heat radiation member is not needed outside of the opposing range. As a result, even when the heat radiation member is placed in the transformer, an increase in size of the transformer can be either reduced or suppressed.

According to yet another aspect of the present disclosure, the at least one heat radiation member has an outer edge entirely contacting an inner peripheral wall (81) of the at least one through hole formed in the holder in an opposing direction in which the first coil and the at least one second coil are opposed each other. Hence, with such a configuration, the through hole can avoid an absence of the heat radiation member between the first coil and the second coil. Thus, both an insulation property and a heat conductivity between the first coil and the second coil can be more effectively improved. Further, since the creeping distance along the surface of the through hole in the holder can be prolonged, creeping discharge generally generated along the surface thereof can be either reduced or suppressed.

According to yet another aspect of the present disclosure, the at least one heat radiation member substantially entirely covers the at least one through hole. Hence, according to such a configuration, since each of the through holes includes the heat radiation member between the first coil and the second coil, an insulation property and a heat conductivity between the first coil and the second coil can be further improved.

According to yet another aspect of the present disclosure, the inner peripheral wall of the at least one through hole formed in the holder has a thinner portion 21*a* (31*a*) than an outer portion (82) of the holder than the through hole. Further, the outer edge of the at least one heat radiation member is overlaid on the thinner portion 21*a* (31*a*) of the flange 21 (23) while fitting to the inner peripheral wall of the at least one through hole. Hence, according to such a configuration, an increase in total thickness of the holder and the heat radiation member can be either suppressed or reduced in a portion in which the holder and the heat radiation member are vertically overlaid on each other. Hence, an increase in size of the transformer can be suppressed while improving insulation between the first coil and the second coil.

According to yet another aspect of the present disclosure, the inner peripheral wall of the at least one through hole of the holder is either stepwise or tapered, wherein the outer edge of the at least one heat radiation member has a shape fitting to the inner peripheral wall of the at least one through hole.

Hence, with the above-described configuration, an inner peripheral wall of the through hole of the holder has ether a step or a tapered portion. Hence, creep discharge generally caused along a surface of the holder in the through hole can be either suppressed or reduced by prolonging the creeping distance without thickening the holder. Further, the outer edge of the heat radiation member has a shape fitting into the inner peripheral wall of the through hole. Hence, since the outer edge of the heat radiation member can be overlaid on the thinner portion 21*a* (31*a*) of the flange while fitting to the inner peripheral wall of the through hole, an increase in total thickness of the heat radiation member and the holder can be either reduced or suppressed.

According to yet another aspect of the present disclosure, the at least one heat radiation member (70) includes a first property member (71) having an insulation property and a second property member (72) having a higher heat conductivity than both the holder and the first property member.

Hence, with the above-described configuration, the first property member having insulation properties can electrically insulate the first coil and the second coil from each other. Further, thermal conduction between the first coil and the second coil can be effectively performed through the second property member with the heat conductivity higher than that of both the holder and the first property member. Furthermore, by allocating the electrical insulating function and the thermal conduction function performed by the heat radiation member to the first property member and the second property member, respectively, the heat radiation member can be easily produced by employing general-purpose material.

According to yet another aspect of the present disclosure, the first property member is inserted into the at least one through hole and the second property member substantially entirely covers both the first property member and the at least one through hole.

Hence, with the above-described configuration, since the first property member is inserted into the through hole, thermal conduction between the first coil and the second coil through the first property member in the through hole can be effectively performed. Further, since the second property member entirely covers both the first property member and the through hole, insulation between the first coil and the second coil can be enhanced.

According to yet another aspect of the present disclosure, the transformer further includes at least one core (60, 65) to surround both the first coil and the at least one second coil (40). Further, the at least one heat radiation member includes at least one second heat radiation members. The at least one second heat radiation member (75) contacts both the at least one second coil and the at least one core (60) between the at least one second coil and the at least one core. Further, the at least one second electrically insulating heat radiation member has a higher heat conductivity than the holder.

Hence, according to the above-described configuration, the core is disposed surrounding the first coil and the second coil. In addition, the second heat radiation member with an insulation property and a heat conductivity higher than that of the holder is disposed contacting both the second coil and the core. Hence, since the second heat radiation member has the insulation property, the second heat radiation member can effectively insulate the second coil and the core from each other. Further, since thermal conduction between the second coil and the core is performed via the second heat radiation member with heat conductivity higher than that of the holder, heat can be effectively conducted from the second coil to the core. Hence, the heat radiation from the coil in the transformer can be further improved.

According to yet another aspect of the present disclosure, either the first coil or the at least one second coil is coated with enamel. Hence, with the above-described configuration, since enamel is generally relatively cheaper, a cost for the transformer can be reduced.

Further, even when the enamel having a pinhole thereby degrading an insulation between coils is used as a coating, the above-described transformer can either reduce or suppress deterioration of the insulation therebetween.

According to yet another aspect of the present disclosure, the at least one heat radiation member is disposed being compressed by the first coil and the at least one second coil. Hence, with such a configuration, thermal conduction between the first coil and the second coil can be effectively promoted.

Numerous additional modifications and variations of the present disclosure are possible in light of the above teachings. It is therefore to be understood that within the scope of the appended claims, the present disclosure may be executed otherwise than as specifically described herein. For example, the present disclosure is not limited to the above-described transformer and may be altered as appropriate.

What is claimed is:

1. A transformer comprising:
   a first coil;
   at least one second coil magnetically coupled with the first coil;
   an electrically insulating holder, the first coil and the at least one second coil facing each other with the holder therebetween, the holder having at least one through hole at a portion sandwiched between the first coil and the at least one second coil; and
   at least one electrical insulating heat radiation member disposed in the at least one through hole in contact with the first coil and the at least one second coil, the heat radiation member having a higher heat conductivity than the holder, wherein:
   the at least one through hole is formed within an opposing range in which the first coil and the at least one second coil face each other;
   the at least one heat radiation member is disposed within the opposing range;
   the holder has a thinner portion around the at least one through hole;
   the at least one heat radiation member has an outer edge that entirely contacts the thinner portion formed around the at least one through hole;
   the thinner portion of the holder is thinner than a radially outer portion of the holder, the radially outer portion being on the outside of the thinner portion; and
   the outer edge of the at least one heat radiation member is overlaid on the thinner portion of the holder in the at least one through hole.

2. The transformer as claimed in claim 1, wherein the at least one heat radiation member substantially entirely covers the at least one through hole.

3. The transformer as claimed in claim 1, wherein an inner peripheral wall of the at least one through hole of the holder is either stepwise or tapered to form the thinner portion, and
   wherein the outer edge of the at least one heat radiation member has a shape fitting to the inner peripheral wall of the at least one through hole.

4. A transformer comprising:
   a first coil;
   at least one second coil magnetically coupled with the first coil;
   an electrically insulating holder, the first coil and the at least one second coil facing each other with the holder therebetween, the holder having at least one through hole at a portion sandwiched between the first coil and the at least one second coil; and
   at least one electrical insulating heat radiation member disposed in the at least one through hole in contact with the first coil and the at least one second coil, the heat radiation member having a higher heat conductivity than the holder,
   wherein the at least one heat radiation member includes a first property member having an insulation property and a second property member having a higher heat conductivity than both the holder and the first property member.

5. The transformer as claimed in claim 4, wherein the first property member is inserted into the at least one through hole and the second property member substantially entirely covers both the first property member and the at least one through hole.

6. The transformer as claimed in claim 1, further comprising:
   at least one core that surrounds both the first coil and the at least one second coil,
   wherein the at least one heat radiation member includes at least one electric insulating second heat radiation member,
   wherein the at least one second heat radiation member is located between the at least one second coil and the at least one core to contact both the at least one second coil and the at least one core, and
   wherein the at least one second heat radiation member has a higher heat conductivity than the holder.

7. The transformer as claimed in claim 1, wherein either the first coil or the at least one second coil is coated with enamel.

8. The transformer as claimed in claim 1, wherein the at least one heat radiation member is compressed by the first coil and the at least one second coil.

9. A DC-DC converter comprising:
   a heat sink;
   the transformer as claimed in claim 6; and
   a converter holder to fix the at least one core to the heat sink,
   wherein the first coil is disposed between a pair of second coils.

* * * * *